United States Patent
Tracy

(10) Patent No.: US 6,954,315 B2
(45) Date of Patent: Oct. 11, 2005

(54) NIGHT VISION AND AUDIO SIGNAL REDUCTION SYSTEM

(75) Inventor: Richard J. Tracy, Elgin, IL (US)

(73) Assignee: Illinois Tool Works Inc., Glenview, IL (US)

(*) Notice: Subject to any disclaimer, the term of this patent is extended or adjusted under 35 U.S.C. 154(b) by 53 days.

(21) Appl. No.: 10/876,970

(22) Filed: Jun. 25, 2004

(65) Prior Publication Data

US 2005/0024742 A1 Feb. 3, 2005

Related U.S. Application Data

(63) Continuation-in-part of application No. 10/632,544, filed on Aug. 1, 2003, now Pat. No. 6,778,336.
(60) Provisional application No. 60/546,226, filed on Feb. 20, 2004.

(51) Int. Cl.[7] .................. G02B 13/20; G02B 13/18; G02B 5/04; G02F 1/1335; B32B 3/00
(52) U.S. Cl. .................. 359/707; 359/615; 359/708; 359/709; 349/113; 428/172
(58) Field of Search .................. 359/707, 708, 359/709–712, 608, 599, 615, 616; 349/113; 428/172

(56) References Cited

U.S. PATENT DOCUMENTS

| | | | |
|---|---|---|---|
| 4,431,266 A | 2/1984 | Mori et al. | 350/167 |
| 4,756,603 A | 7/1988 | Ohtani | 350/276 R |
| 5,212,596 A | 5/1993 | Andrus | 359/614 |
| 5,763,049 A * | 6/1998 | Frey et al. | 428/172 |
| 5,861,990 A * | 1/1999 | Tedesco | 359/599 |
| 5,919,551 A | 7/1999 | Cobb, Jr. et al. | 428/156 |
| 6,199,989 B1 | 3/2001 | Maeda et al. | 359/613 |
| 6,456,437 B1 | 9/2002 | Lea et al. | 359/625 |
| 6,502,943 B2 | 1/2003 | Nakamura et al. | 359/603 |
| 6,528,142 B2 | 3/2003 | Ikegaya et al. | 428/141 |
| 6,555,203 B1 | 4/2003 | Karlsson | 428/178 |
| 2002/0094417 A1 | 7/2002 | Phillips | 428/172 |
| 2002/0097496 A1 | 7/2002 | Lu | 359/628 |
| 2002/0163728 A1 | 11/2002 | Myers | 359/613 |
| 2003/0063387 A1 | 4/2003 | Miyazaki et al. | 359/613 |

* cited by examiner

Primary Examiner—Timothy Thompson
(74) Attorney, Agent, or Firm—Mark W. Croll; Paul F. Donovan

(57) ABSTRACT

A surface configuration obscures an object from detection by night vision devices, ultraviolet devices and infrared devices. The surface configuration is three dimensional, having spaced inner and outer surfaces. A wall defines a plurality of enclosed cells, and projections extend from the inner surface within the cells. The cells can be hexagonal, round or otherwise shaped. The projections can be flat sided or curved. The shapes of the cells and materials used provide sound muffling.

23 Claims, 1 Drawing Sheet

NIGHT VISION AND AUDIO SIGNAL REDUCTION SYSTEM

CROSS REFERENCE TO RELATED APPLICATIONS

The present invention is a continuation-in-part of U.S. patent application Ser. No. 10/632,544 filed on Aug. 1, 2003; now U.S. Pat. No. 6,778,336 and claims benefit to U.S. Provisional Application Ser. No. 60/546,226 filed on Feb. 20, 2004.

FIELD OF THE INVENTION

The present invention relates generally to camouflaging surface treatments and, more particularly, the invention relates to surfaces having reduced visibility to night vision devices and other vision enhancing devices, and surfaces providing a reduced audio signal in use.

BACKGROUND OF THE INVENTION

Military and law enforcement organizations are becoming increasingly reliant on the use of night vision and other detecting devices and systems. The proven battlefield success of night vision devices has produced a large number and an increasing availability of both new and used military and consumer designed night vision devices. Consequently, it is easy for criminal organizations and individuals to obtain and use night vision devices against law enforcement agencies, fire departments or other public supported groups that may or may not have such devices. The safety of people in these groups is compromised by the availability of night vision devices to criminals and criminal organizations or groups.

Virtually all armies that are equipped even moderately well have and use night vision devices regularly. Paramilitary organizations or groups, terrorists and subversives can obtain night vision devices on secondary markets with relative ease. The visibility of people and things is improved greatly through night vision devices. Peculiarly, night vision devices themselves can be highly visible through other night vision devices, and the visible signature thereof can be used by sophisticated militaries to identify the source of the device and the probable allegiance of the user based thereon. As will be further explained below, this is especially true if the night vision device is black in color. Moreover, even if the device itself is somehow camouflaged, the user of a night vision device can be identified by the patterns formed by various pieces of uncloaked components and equipment found on the user.

The potential for misuse of night vision devices against law enforcement and fire departments or against friendly military organizations is high. The ability to conduct surveillance or other operations against criminals, subversives and other unfriendly groups is compromised by the availability of night vision or other vision enhancing or detecting equipment to the groups.

When viewed with night vision devices, certain surfaces are more readily detected than others are. A number of factors contribute to the detectability of an object, including the material composition, surface finishes, colors, reflectivity and various other factors. Articles made from many different plastics are very visible when viewed with night vision devices. It has been found that many common hardware components, such as buckles, molded pack frames, weapon components and other plastic equipment pieces that are mission critical in both military and law enforcement engagements are seen readily with night vision devices. Consequently, even if clothing or other surrounding materials are treated to reduce visibility through night vision devices, a buckle, weapon or other article or component can reveal the location of an otherwise camouflaged and hidden individual.

Even if camouflaged visually, an individual or group can be detected by sounds emanating from equipment carried or used. Muffling the sound created from equipment contacting other equipment or contacting surrounding objects can promote the undetected movement of the individual or group.

Therefore, it is desirable to provide surface attributes on articles and components thereof that will reduce the visibility and signal of night vision devices, infrared devices and ultraviolet viewing devices. Also, the reduction of glare and flashing caused by reflected light is an advantageous attribute for surfaces of equipment used by police, the military and other organizations. Sound muffling, or sound and noise attenuation, of tactile equipment and other items is also desirable.

SUMMARY OF THE INVENTION

The present invention addresses the above-identified needs by providing a three-dimensional surface configuration that causes inconsistent reflectivity and varied angles of incidence and reflectivity when exposed to light sources, and which is made of materials reducing noise and cushioning the device.

An advantage of the present invention is providing a surface treatment for articles and things that reduces detection by night vision devices.

Another advantage of the present invention is providing a surface treatment that reduces glare and flashing caused by reflected light.

Still another advantage of the present invention is providing a surface that is easy to manufacture into articles during molding of the article.

A further advantage of the present invention is providing a detection-limiting surface that can be made as a discrete body attachable to other articles to modify existing devices to become less visible.

A still further advantage of the present invention is providing a vision-reducing surface that also reduces noise from objects and things contacting the surface.

Other features and advantages of the invention will become apparent to those skilled in the art upon review of the following detailed description, claims and drawings in which like numerals are used to designate like features.

Figure 1:
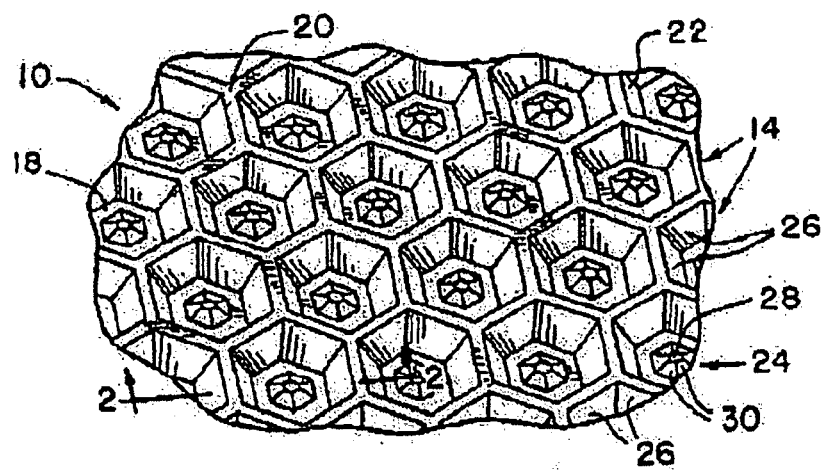
FIG. 1 is a perspective view of a first embodiment of a surface in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof as well as additional items and equivalents thereof

DETAILED DESCRIPTION OF THE PREFERRED EMBODIMENT

Referring now more specifically to the drawings and to FIG. 1 in particular, a device or body 10 is shown having a surface configuration 12 (FIGS. 2 and 3) of the present invention. Surface configuration 12 includes a plurality of formations 14 closely packed on body 10. Only some formations 14 and the components thereof to be described hereinafter and not all formations 14 or the components thereof are labeled in FIG. 1, for purposes of clarity.

Figure 3:
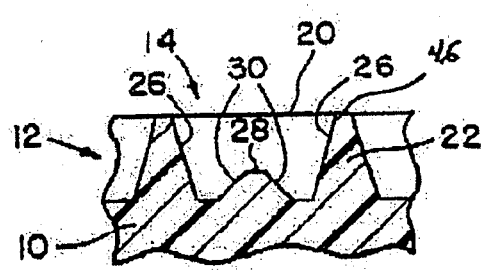
FIG. 3 is a cross-sectional view similar to that of FIG. 2 but of a modified form of the first embodiment.

Body 10 can be made of a variety of materials, including plastics for which the present invention is applied easily. In plastic articles, surface configurations 14 can be formed during molding of an article or thing made of the plastic, such as a buckle for a strap, a frame piece of a backpack, plastic components of weapons or tools or other articles manufactured by any of various molding processes. A mold for the plastic article can be shaped to include surface formations 14 in forms to be described hereinafter. In such devices and things, surface configuration 12 becomes an integral feature of the outer surface of the device or thing, or the part thereof including body 10, as shown in FIG. 3.

Figure 2:
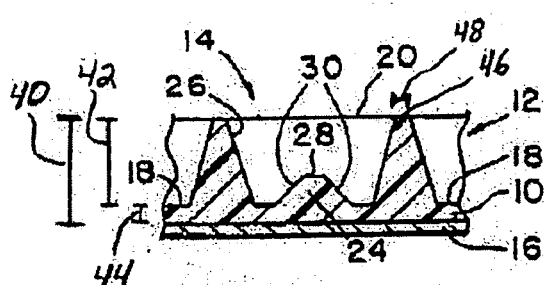
FIG. 2 is a cross-sectional view of the surface shown in FIG. 1, taken along line 2—2 of FIG. 1.

Alternatively, as seen best in FIG. 2, surface configuration 12 can be formed on one face of a relatively thin, discrete body 10. Thereafter, adhesive 16 can be used in a layer on an opposite face of body 10 to attach body 10 to another article. In this way, the present invention can be used not only as a surface on newly manufactured devices by molding it into the surface, the present invention also can be added or applied on surfaces of other things, which may or may not be made of plastic. Articles made of other materials can be rendered less visible to night vision devices by adhering a body 10 to the existing article or thing, the body 10 having surface configuration 12 on one face thereof Further, panels of body 10 with surface configuration 12 can be placed so as to hide other things behind the panels.

Surface configuration 12 includes closely adjacent, three-dimensional formations 14 defining an inner surface 18 and an outer surface 20. Advantageously, inner surface 18 and outer surface 20 are spaced from each other by a significant distance, preferably by as much as available space and other design constraints allow in body 10. Individual formations 14 preferably are smaller rather than larger, and are more tightly arranged rather than more loosely arranged, for more thoroughly disrupting the reflected light from the object. Formations 14 are configured and arranged to provide outer surface 20 with a small surface area relative to the size of body 10.

Each formation 14 includes a nested arrangement of an outer wall 22 and inner projection 24. The combination of nested features provides inconsistent reflectivity of light, reducing the clarity and distinctness by which the surface is detected with night vision devices.

In a preferred form, outer wall 22 is formed as a plurality of panels 26 between inner surface 18 and outer surface 20. Panels 26 define a laterally closed cell that is open at outer surface 20. Preferably, six panels 26 are provided to define hexagonal cells that can be tightly packed adjacent each other. Each panel 26 is wider at outer surface 20 than at inner surface 18 so that the exposed surface thereof angles inwardly in the cell defined thereby.

Inner projection 24 extends outwardly from inner surface 18 and has a distal end 28. Projection 24 preferably is shorter than outer wall 22, and distal end 28 is located between inner surface 18 and outer surface 20.

An advantageous form of inner projection 24, particularly useful with hexagonally shaped wall 22, is configured with a plurality of flat surfaces 30, preferably six flat surfaces 30. Projection 24 is wider at inner surface 18 than at distal end 28, tapering smoothly from inner surface 18 to distal end 28.

Figure 4:
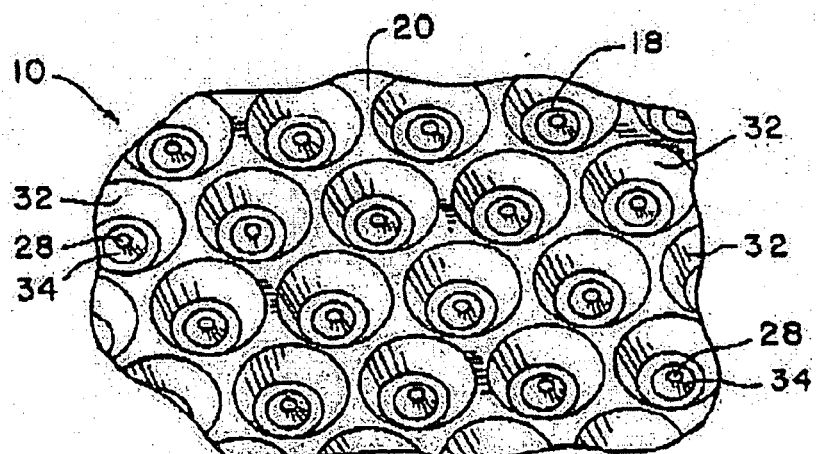
FIG. 4 is a perspective view of a further embodiment of the present invention.

Hexagonally shaped walls 22 and six-sided projections 24 are one preferred arrangement of surface configuration 12; however, other arrangements also can be used. For example, instead of being made of flat segments, wall 22 can be continuously curved. FIG. 4 illustrates an embodiment of the present invention in which a continuously curved wall 32 is round, and a projection 34 arranged therein is a frustum or truncated cone. In a preferred form, curved wall 32 is of greater diameter at outer surface 20 than at inner surface 18.

Other geometric arrangements are also believed to be suitable, if sufficiently closely arranged on the article or thing. To be suitable, the geometric arrangement includes surfaces arranged at various angles to provide inconsistent angles of incidence and reflection with respect to a light source shinning on the object. With each formation being relatively small, and with all formations being closely and compactly arranged, large expanses forming areas of consistent reflectivity are minimized, and the surface is less detectable to a variety of vision enhancing devices.

In the preferred embodiments shown and described herein, a projection 24 or 34 is shown within each wall 22 or 32. In some uses of the invention, it may be suitable to provide random or patterned arrangements in which not all walls 22 or 32 have a projection 24 or 34 contained there within. Further, combinations may be used in which a continuously curved wall 32 has a flat sided projection 24 therein, or a wall 22 made of flat panels 26 has a frusto-conical or other curved projection 34 therein.

The present invention can be combined with other light controlling features. For example, when used on plastic components, resin compounds can be formulated to include light absorbing and/or light-reflecting dyes. Features such as these can be used to reduce visibility of an object within the range of between about 300 and 3000 nanometer wavelength, and preferably in the range of about 600 to 2000 nanometers. A suitable dye for a variety of applications is Shepard 473 or 474 available from The Shepard Color Company, 4539 Dues Drive, Cincinnati Ohio 45246.

Surface configurations 12 of the present invention can be used with a variety of materials for a variety of purposes, especially when device or body 10 is a discrete body configured to attachment to another structure. The material from which surface configuration 12 is formed can be relatively rigid and plate-like, or the material can have flexibility to conform to an irregularly shaped article upon which it is applied. The material can be bi-axially stretchable or uni-axially stretchable, as required for a specific application. For example, material having a surface configuration of the present invention can be applied as cushioning on the inside of vehicles, to provide padding for occupants in addition to reduced visual detectability and improved sound muffling. The cell structure can deflect or crush slightly when impacted, thereby also functioning as a cushion or padding for people and objects.

In one suitable use of the present invention, thermo setting urethanes such as isocyanate urethanes are used. Materials of different durometer can be used, depending on the need for softness or stiffness of the material. A suitable material for a variety of applications is Poly 33925 available from BayOne Urethane Systems, LLC., 2700 Papin Street, St. Louis, Mo. 63103. The material can be made more or less flexible or more or less rigid by the addition or removal of various additives. Again, by way of example, fillers or reinforcing material can be added, such as glass fibers, fabric fibers, mineral fillers or nanoparticles.

In a preferred configuration, the overall thickness of body 12, as indicated by the dimensional line 40 in FIG. 2, is about 0.0080 inch. The depth of each cell formed therein, between inner surface 18 and outer surface 20, as indicated by the dimensional line 42 in FIG. 2, is approximately 0.0060 inch. Thus, the material remaining at the bottom of each cell, as indicated by the dimensional line 44 in FIG. 2, has a thickness of about 0.0020 inch In general, preferred cell sizes are small at the outer surface, and relatively deep in comparison to the surface opening. Cells are closely packed, with minimal regions of material disposed along the outer surface between cells. It is preferred that ridge areas 46 between cells have a width, as indicated by the dimensional line 48 in FIG. 2, of between about 0.001 and 0.050 inch, and more preferably less than about 0.002 inch. As a result, the exposed area of the outer surface is kept small.

The three dimensional shape and openness of the cells provides a cushioning effect that creates sound muffling when an object having the material thereon is contacted by another object or thing. Thus, normal use of equipment having the present surface configuration generates less noise than otherwise would be created. The cushioning effect can be increased by reducing the rigidity of the material, such as by using fewer fiber additives or other reinforcing techniques. However, because of the open cell structure, even relatively rigid embodiments of the present invention provide significant sound muffling.

Adhesives used for attaching sheets of material having the surface configuration of the present invention can be of a variety of types. Acrylic-based as well as urethane based adhesives of different tackiness have been used advantageously. Chemical resistivity can be built into the material and/or adhesives used so that the material and adhesive are resistive to petrochemical and hydrocarbon degradation. A suitable adhesive for a variety of applications is HS00463-b available from Coating and Converting Technologies, 80 East Morris Street, Philadelphia, Pa. 19148.

The pitted or open cell outer surface area further provides an improved gripping surface so that items such as weapons or other equipment are more easily grasped and held. Graspability can be further improved by forming the surface configuration of the present invention from a material such as thermoset urethanes that have a tactile or grip enhancing surface.

Variations and modifications of the foregoing are within the scope of the present invention It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A body having reduced visibility and sound muffling, comprising:
    a surface configuration for diffusing reflected light, including:
        an outer surface of minimal surface area;
        an inner surface spaced from said outer surface;
        closely adjacent walls between said outer surface and said inner surface defining with said inner surface a plurality of enclosed cells open at said outer surface, said walls disposed at differing angles with respect to said surfaces for providing inconsistent and varied surface reflectivity by providing varied angles of incidence and varied angles of reflectivity when exposed to light; and
    said body formed of a flexible polymer three-dimensionally configured to yield to contact from anticipated use.

2. The body of claim 1, said polymer being a thermosetting resin.

3. The body of claim 2, said polymer being an isocyanate.

4. The body of claim 2, said polymer containing infrared reflecting dye.

5. The body of claim 2, said polymer containing dye reflecting light within a range of about 600 to 2000 nm.

6. The body having a surface configuration of claim 1, said walls being continuously curved.

7. The body of claim 1, said body being bi-axially stretchable.

8. The body of claim 1, said body being uni-axially stretchable.

9. The body of claim 1, said polymer containing reinforcing particles.

10. The body of claim 9, said particles being at least one of glass fibers, fabric fibers, mineral fibers and nanoparticles.

11. The body of claim 1, said cells being conjoined geometric shapes including one of hexagons, squares, rectangles, circles, octagons and cones.

12. The body of claim 1, said inner surface and said outer surface spaced by approximately 0.0060 inch.

13. The body of claim 12, said cells being separated by ridges, said ridges each having a width on said outer surface less than about 0.0020 inch.

14. The body of claim 1, said cells being separated by ridges, said ridges each having a width on said outer surface less than about 0.0020 inch.

15. The body of claim 1, said configuration being on a first side of said body, and said body having adhesive on a second side thereof for attaching said body to an object.

16. The body of claim 1, said adhesive being an acrylic or urethane adhesive.

17. The body of claim 1, wherein the body is formed from thermoplastic resins.

18. The body of claim 1, further comprising:
    projections from said inner surface within at least some of said enclosed spaces, said projections also providing inconsistent and varied surface reflectivity by providing varied angles of incidence and varied angles of reflectivity when exposed to light.

19. A means for reducing the detectability of an object, said means comprising:
    means for providing on the object a three dimensional surface configuration including a plurality of individual formations defining an inner surface and an outer surface;
    means for providing a light reflective dye, and including the dye in the surface configuration;

means for creating each formation to form an enclosed cell open at the outer surface, including forming a wall between the inner and outer surfaces to have differing angles with respect to a light source; and means for forming a projection from the inner surface within the cells.

20. The means of claim 19, including molding the surface configuration integrally with the object while molding the object.

21. The means of claim 19, including providing the surface configuration on a discrete body separate from the object, and attaching the body to the object.

22. The means of claim 19, including adding reinforcing particles to said surface configuration.

23. A body having reduced visibility and sound muffling, comprising:

light-reflecting dye contained in said body, said dye reflecting light within a range of wavelengths of between about 300 and 3000 nanometers;

said body having a surface configuration for diffusing reflected light, including:

an outer surface of minimal surface area;

an inner surface spaced from said outer surface by at least about 0.0060 inch;

closely adjacent walls between said outer surface and said inner surface defining with said inner surface a plurality of enclosed cells open at said outer surface, said walls disposed at differing angles with respect to said surfaces for providing inconsistent and varied surface reflectivity by providing varied angles of incidence and varied angles of reflectivity when exposed to light, said cells separated by ridges exposed at said outer surface, said ridges each having a width within a range of between about 0.001 and about 0.050 inch; and projections from said inner surface within at least some of said enclosed spaces, said projections also providing inconsistent and varied surface reflectivity by providing varied angles of incidence and varied angles of reflectivity when exposed to light.

* * * * *